United States Patent [19]

Reichel

[11] 4,435,592

[45] Mar. 6, 1984

[54] PROCESS FOR THE PREPARATION OF POLYETHER-ESTER POLYOLS

[75] Inventor: Curtis J. Reichel, Wyandotte, Mich.

[73] Assignee: BASF Wyandotte Corporation, Wyandotte, Mich.

[21] Appl. No.: 426,312

[22] Filed: Sep. 29, 1982

[51] Int. Cl.$^3$ .................... C07C 67/08; C07C 67/26
[52] U.S. Cl. .................................. 560/91; 521/137; 560/79; 560/93
[58] Field of Search ............................ 560/91, 79, 93

[56] References Cited

U.S. PATENT DOCUMENTS

| | | | |
|---|---|---|---|
| 3,374,208 | 3/1968 | Seiner et al. | 524/43 X |
| 3,459,733 | 8/1969 | Byrd et al. | 560/91 |
| 3,931,092 | 1/1976 | Ramlow et al. | 524/43 X |
| 4,014,846 | 3/1977 | Ramlow et al. | 524/43 X |
| 4,093,573 | 6/1978 | Ramlow et al. | 524/43 X |
| 4,144,395 | 3/1979 | Murphy et al. | 560/200 |

*Primary Examiner*—Natalie Trousof
*Assistant Examiner*—Vera C. Clarke
*Attorney, Agent, or Firm*—Norbert M. Lisicki

[57] ABSTRACT

Polyether-ester polyols are prepared by reacting a crude polyether polyol, tetrahydrophthalic anhydride and an alkylene oxide. These polyols may be used in preparing polyurethane products.

10 Claims, No Drawings

PROCESS FOR THE PREPARATION OF POLYETHER-ESTER POLYOLS

BACKGROUND OF THE INVENTION

1. Field of the Invention

The present invention relates to a process for the preparation of polyether-ester polyols. More particularly, the invention relates to the preparation of these polyols by reacting an alkaline catalyst containing polyoxyalkylene polyether polyol, tetrahydrophthalic anhydride and an alkylene oxide.

2. Description of the Prior Art

The preparation of polyether-ester polyols by the reaction of an alkylene oxide with a half acid ester obtained by the reaction of a polyol with an unsaturated acid anhydride is well known in the art as taught in U.S. Pat. Nos. 3,931,092, 4,014,846, 4,093,573 and 4,144,395. These patents relate to uncatalyzed or trialkylaminecatalyzed reactions. U.S. Pat. No. 3,374,208 teaches the use of various metal catalysts for the preparation of polyesters. The prior art, however, does not teach the preparation of polyether-ester polyols having an acidity of less than 1 mg KOH/gm of sample employing the process of the instant invention.

SUMMARY OF THE INVENTION

This invention is directed to an improvement in the process for preparing polyether-ester polyols comprising reacting an alkaline catalyst containing polyoxyalkylene polyether polyol, tetrahydrophthalic anhydride, and an alkylene oxide wherein said polyether-ester polyol has an acid number of less than about 1 expressed as mg KOH/gm of sample.

DESCRIPTION OF THE PREFERRED EMBODIMENTS

In the preferred embodiment for the preparation of these polyether-ester polyols, the improvement comprises (a) reacting an alkaline catalyst containing polyoxyalkylene polyether polyol, and tetrahydrophthalic anhydride to form a half acid ester (b) reacting the product of (a) with an alkylene oxide and (c) removing the catalyst to obtain a product having an acid number of less than 1 mg KOH/gram. This reaction is conducted at temperatures from about 75° C. to about 175° C., preferably at about 125° C.

The crude polyols employed in the process of the present invention are prepared by alkaline catalysis of an organic compound having at least two active hydrogen atoms with an alkylene oxide or a mixture thereof. The alkaline catalysts may include alkali metal hydroxides, or alkali metal alkoxides such as sodium hydroxide, potassium hydroxide, sodium alkoxide, potassium alkoxide, and so forth. Additional catalysts which may be employed in the preparation of such polyols include the hydroxides and alkoxides of lithium, rubidium or cesium. The concentrations of these catalysts range from about 1700 to about 5000 parts per million. Alternatively the polyether-ester polyols may be prepared by (a) reacting a organic compound containing three hydroxyl groups and having an equivalent weight from about 30 to about 100 with tetrohydrophthalic anhydride in the presence of an alkaline catalyst, (b) reacting the product of (a) with an alkylene oxide or mixtures thereof, and (c) removing said catalyst.

The organic compounds may be glycerine, trimethylolpropane, trimethylolethane, 1,2,6-trihydroxyhexane and the like.

The alkylene oxides which may be employed for the preparation of the polyether-ester polyols include ethylene oxide, propylene oxide, butylene oxide, amylene oxide and mixtures of these oxides.

Representative polyols which may be employed in the subject invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyoxyalkylene polyether polyols, polyhydroxy-terminated polyurethane polymers, and alkylene oxide adducts of polyacetals, aliphatic polyols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Generally, equivalent weight of the polyols will vary from 100 to 10,000, preferably from 1000 to 3000.

Any suitable polyoxyalkylene polyether polyol may be used such as the polymerization product of an alkylene oxide or a mixture of alkylene oxides with a polyhydric alcohol containing from 2 to 8 hydroxyl groups. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepaed by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.$P_2O_5$.

Suitable polyacetals which may be condensed with alkylene oxides include the reaction product of formaldehyde or other suitable aldehyde with a dihydric alcohol or an alkylene oxide such as those disclosed above.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

The unsaturated polyols of the instant invention may be prepared by the reaction of any crude conventional polyol such as those described above with tetrahydrophthalic anhydride.

In addition to being useful in the preparation of polyurethanes, the polyols prepared in accordance with the process of the subject invention find utility as precursors in the preparation of graft polymer dispersions as disclosed in U.S. Pat. Nos. 3,652,658, 3,875,258, 3,950,317 and 3,953,393.

The following examples illustrate the nature of the invention. All parts are by weight unless otherwise indicated.

The following abbreviations are employed in the examples below:

Polyol A is a trimethylolpropane, propylene oxide, ethylene oxide heteric adduct containing 15 percent ethylene oxide and having a hydroxyl number of 25 containing 0.23 percent KOH catalyst.

Polyol B is a glycerine, propylene oxide, ethylene oxide adduct containing a 15 percent ethylene oxide cap and having a hydroxyl number of 25 containing 0.23 percent KOH catalyst.

Polyol C is glycerine.

Polyol D is a glycerine propylene oxide adduct having a hydroxyl number of 257 containing 3 percent KOH catalyst.

PROCEDURE FOR EXAMPLES 1-5, 8 AND 9

Into a 1 gallon steam heated, stainless steel autoclave, 2500 grams of the designated crude polyol and 59.3 grams of tetrahydrophthalic anhydride were charged. After heating to 125° C. and pressuring with nitrogen, the polyol and anhydride were reacted for 3 hours at 125° C. After adjusting the pressure to 34 psig with nitrogen, 125 grams of ethylene oxide was added. After reacting for 8 hours at 125° C., the reaction mass was discharged and the catalyst removed by treatment with a synthetic magnesium silicate adsorbent, filtration, and stripping the filtrate at 105° C. at <10 mm Hg pressure.

PROCEDURE FOR EXAMPLE 6

Into a 500 ml round bottom flask equipped with a stirrer, thermometer, addition funnel and reflux condenser, 22.8 grams of glycerine and 10.4 grams of 45 percent aqueous KOH catalyst were charged. The mixture was heated for 1 hour at 105° C., and then the water was stripped off at 105° C. and 7 mm Hg pressure. An amount of 37.6 grams of tetrahydrophthalic anhydride was added and reacted at 105° C. for 1 hour followed by the addition of 194.3 grams of propylene oxide. The contents were then transferred to a 1 gallon autoclave. An additional amount of 1500 grams of propylene oxide was added at 125° C., the reaction proceeded for 8 hours and was followed by the addition of 300 grams of ethylene oxide. This mixture was allowed to react for 2 hours and the catalyst was removed as previously described.

PROCEDURE FOR EXAMPLE 7

Into a 1 gallon steam heated stainless steel autoclave 241 grams of polyol D and 55.8 grams of tetrahydrophthalic anhydride were charged. The autoclave was pressured with nitrogen and the mixture was reacted at 125° C. for 2 hours. An amount of 2318 grams of propylene oxide was added over an 8 hour period followed by a 4 hour reaction period. An amount of 450 grams of ethylene oxide was then added in 2 hours and allowed to react for another 2 hour period. The product was discharged and the catalyst removed as described above.

TABLE

| Examples | THPA Anhydride Equivalents* | Polyol | OH No. | Acid No. | Saponification No. | Unsaturation | Viscosity cps, 25° C. |
|---|---|---|---|---|---|---|---|
| 1 | 0.8 | A | 21.5 | 0.36 | — | 0.16 | 5,250 |
| 2 | 0.8 | A | 20.2 | 0.46 | 14.6 | 0.15 | 5,880 |
| 3 | 0.8 | B | 21.6 | 0.50 | 14.2 | 0.11 | 5,320 |
| 4 | 1.0 | B | 20.9 | 0 | 18.2 | 0.18 | 11,160 |
| 5 | 1.5 | B | 19.8 | 0.31 | 28.0 | 0.23 | 9,860 |
| 6 | 1.0 | C | 28.8 | 0.11 | 9.1 | 0.15 | 1,560 |
| 7 | 1.0 | D | 28.5 | 0.31 | 12.8 | 0.15 | 1,640 |
| 8 | 0.8 | A | 11.3 | 7.0 | 17.2 | 0.19 | 1,815 |
| 9 | 0.8 | B | 14.8 | 5.2 | 17.2 | 0.20 | 1,905 |

*tetrahydrophthalic anhydride equivalents per mole of polyol.

The embodiments of the invention in which an exclusive privilege or property is claimed are defined as follows:

1. A process for the preparation of a polyether-ester polyol comprising (a) reacting an alkaline catalyst, selected from the group consisting of hydroxides and alkoxides of sodium, potassium, lithium, rubidium and cesium, containing polyoxyalkylene polyether polyol with tetrahydrophthalic anhydride to form a half acid ester, (b) reacting the product of (a) with an alkylene oxide and (c) removing the catalyst.

2. The process of claim 1 wherein the concentration of the catalyst employed is from 0.17 to 0.5 weight percent based on the weight of polyol.

3. The process of claim 1 wherein the polyoxyalkylene polyether polyol is the reaction product of a polyhydric alcohol and an alkylene oxide selected from the group consisting of ethylene oxide, propylene oxide and butylene oxide.

4. The process of claim 1 wherein the alkylene oxide is ethylene oxide.

5. The process of claim 1 wherein the alkylene oxide is propylene oxide.

6. The process of claim 1 wherein the reaction temperature is from about 75° C. to about 175° C.

7. A process for the preparation of a polyether-ester polyol comprising (a) reacting an organic compound containing three hydroxyl groups and an equivalent weight of 30 to 100 with tetrahydrophthalic anhydride in the presence of an alkaline catalyst, selected from the group consisting of hydroxides and alkoxides of sodium, potassium, lithium, rubidium and cesium, (b) reacting the product of (a) with an alkylene oxide or mixtures thereof, and (c) removing said catalyst.

8. The process of claim 7 wherein the concentration of the catalyst employed is from 0.17 to 0.5 weight percent based on the weight of polyol.

9. The process of claim 7 wherein the organic compound is selected from the group consisting of glycerine, trimethylolpropane, trimethylolethane, and 1,2,6-trihydroxyhexane.

10. The process of claim 7 wherein the reaction temperature is from about 75° C. to about 175° C.

* * * * *